United States Patent [19]
Tong et al.

[11] Patent Number: 5,652,477
[45] Date of Patent: Jul. 29, 1997

[54] MULTILAYER ANTISTATIC/ANTIREFLECTIVE COATING FOR DISPLAY DEVICE

[75] Inventors: Hua-Sou Tong, Arlington Heights, Ill.; Chung-Min Hu; Mi-Yui Hsu, both of Taiwan, China

[73] Assignee: Chunghwa Picture Tubes, Ltd., China

[21] Appl. No.: 555,515

[22] Filed: Nov. 8, 1995

[51] Int. Cl.$^6$ ............... H01J 31/00; B05D 5/06
[52] U.S. Cl. ............ 313/479; 313/635; 427/64; 427/68; 427/105; 427/106; 427/108; 427/126.2; 427/126.3; 427/162; 427/165; 427/240; 427/419.3
[58] Field of Search ............... 427/64, 68, 162, 427/165, 240, 419.3, 126.2, 126.3, 108, 105, 106; 313/479, 635

[56] References Cited

U.S. PATENT DOCUMENTS

| | | |
|---|---|---|
| 2,522,531 | 9/1950 | Mochel. |
| 2,564,677 | 8/1951 | Davis. |
| 2,564,707 | 8/1951 | Mochel. |
| 2,564,709 | 8/1951 | Mochel. |
| 2,564,710 | 8/1951 | Mochel. |
| 2,808,351 | 10/1957 | Colbert et al.. |
| 2,833,902 | 5/1958 | Gaiser et al.. |
| 2,852,415 | 9/1958 | Colbert et al.. |
| 2,919,212 | 12/1959 | Gaiser. |
| 3,093,598 | 6/1963 | McMillan et al.. |
| 3,252,829 | 5/1966 | Romstadt et al.. |
| 3,738,732 | 6/1973 | Ikeda ............................. 350/164 |
| 4,263,335 | 4/1981 | Wagner et al. ................. 427/110 |
| 4,271,210 | 6/1981 | Yoldas ............................ 427/64 |
| 4,393,095 | 7/1983 | Greenberg ..................... 427/109 |
| 4,468,702 | 8/1984 | Jandrell ......................... 358/245 |
| 4,490,227 | 12/1984 | Bitter ....................... 204/192 SP |
| 4,563,612 | 1/1986 | Deal et al. ..................... 313/478 |
| 4,649,126 | 3/1987 | Gaprindashvili et al. ......... 501/43 |
| 4,650,557 | 3/1987 | Bitter ........................ 204/192.12 |
| 4,785,217 | 11/1988 | Matsuda et al. ................. 313/479 |
| 4,857,361 | 8/1989 | Bloss et al. .................... 427/109 |
| 4,945,282 | 7/1990 | Kawamura et al. ............... 313/479 |
| 4,987,338 | 1/1991 | Itoa et al. ...................... 313/478 |
| 5,051,652 | 9/1991 | Isomura et al. ................. 313/479 |
| 5,099,171 | 3/1992 | Daiku et al. .................... 313/479 |
| 5,122,709 | 6/1992 | Kawamura et al. ............... 313/479 |
| 5,189,337 | 2/1993 | Endo et al. .................... 313/479 |
| 5,200,667 | 4/1993 | Iwasaki et al. ................. 313/478 |
| 5,254,904 | 10/1993 | VanDeLeest et al. ............. 313/479 |
| 5,281,365 | 1/1994 | Sohn et al. ...................... 427/64 |
| 5,291,097 | 3/1994 | Kawamura et al. ............... 313/478 |
| 5,322,540 | 6/1994 | Jacquet et al. ................... 65/60.2 |
| 5,382,383 | 1/1995 | Hirai et al. ..................... 252/501.1 |
| 5,387,433 | 2/1995 | Balian et al. ................... 427/126.3 |

FOREIGN PATENT DOCUMENTS 0585819  8/1993  European Pat. Off..

*Primary Examiner*—Janyce Bell
*Attorney, Agent, or Firm*—Emrich & Dithmar

[57] ABSTRACT

For use on the outer surface of a faceplate of a display device such as of the cathode ray tube (CRT) type, a first inner antistatic layer of Sb—$SnO_2$ (particle size between 5–20 nm) is applied to a thickness in the range of 200–600 nm. The Sb—$SnO_2$ layer has a high light refractive index ($n_1$=1.8) and also provides an antireflection function. After pre-heating the faceplate to a temperature in the range of 35°–50° C., a second intermediate antireflection layer of colloidal $TiO_2$ (light refractive index $n_2$=2.0 and particle size between 5–50 nm) is applied over the first inner layer to a thickness of 100–200 nm. A third outer antireflection layer is then applied over the intermediate layer in the form of a silica gel coating at a temperature in the range of 35°–45° C. with a thickness in the range of 100–200 nm and a light refractive index $n_3$. The second and third antireflective layers follow the ¼ wavelength rule, where $n_3 \approx \sqrt{n_2}$. The multilayer antireflective coating may also be employed in a five layer coating, where the $TiO_2$ and silica gel layers are repeated in proceeding outward from the glass substrate to provide a wideband antireflection capability.

12 Claims, 3 Drawing Sheets

MULTILAYER ANTISTATIC/ ANTIREFLECTIVE COATING FOR DISPLAY DEVICE

FIELD OF THE INVENTION

This invention relates generally to video display devices and is particularly directed to a multilayer coating for the outer surface of a faceplate of a video display device which affords a wideband antireflection capability and can be applied by conventional means such as liquid spin coating.

BACKGROUND OF THE INVENTION

Display devices such as a cathode ray tube (CRT) or a flat display panel provide a video image for viewing. The display panel is generally comprised of glass and includes one or more layers of an antistatic and antireflective coating on its outer surface for reducing light reflections which degrade the video image. With the increasing emphasis on viewer ergonomics, providing these types of display devices with an antireflective characteristic has become of critical importance to the general acceptance and commercial success of the display device. Because of the composition of the different layers employed, a multilayer coating is typically applied by either chemical vapor deposition (CVD) or physical vapor deposition (PVD). The complexity and high cost of applying a multilayer coating by either of these approaches has precluded this type of coating from gaining widespread commercial acceptance.

Other display panel coating approaches employ a single layer where the antireflective and antistatic components are mixed together to form a single solution a applied as a one-layer coating. Still other approaches first apply an inner antistatic layer followed by an outer antireflective layer to form a two-layer coating. The single and two layer approaches typically employ a liquid spin method of application of the layer, or layers, which method is widely used in the display device industry. However, the single layer or two-layer approach is characterized as providing an antireflection capability over only a limited bandwidth.

The present invention addresses the aforementioned limitations of the prior art by providing a multilayer antireflection coating for the glass display panel of a video display device which affords a broadband antireflection capability where each of the layers may be applied using conventional liquid spin techniques.

OBJECTS AND SUMMARY OF THE INVENTION

Accordingly, it is an object of the present invention to provide a multilayer antireflective coating for the outer surface of a faceplate of a video display device which suppresses light reflection from the faceplate's outer surface over a wide bandwidth.

It is another object of the present invention to provide a multilayer antireflective coating for a video display panel which can be applied using liquid spin coating techniques and which provides a wide band antireflection capability.

A further object of the present invention is to provide a multilayer antireflection/antistatic coating for a video display panel wherein the light refractive index initially increases in proceeding outwardly from the display panel, followed by a decrease in the light refractive index in proceeding towards the outermost layer.

A still further object of the present invention is to provide a multilayer antistatic/antireflection coating for a video display panel wherein the innermost conductive layer not only performs an antistatic function, but also serves as the high light refractive index base for the outer antireflection layers.

This invention contemplates a multilayer coating applied to the outer surface of a video display panel by spin coating, the coating comprising: a first conductive grounded inner layer disposed on the outer surface of said display panel, the first inner layer having a light refractive index $n_1$; a second antireflective layer disposed on said first inner layer, wherein the second layer has a light refractive index $n_2$, wherein $n_2 > n_1$; and a third antireflective layer disposed on the second antireflective layer, wherein the third antireflective layer has a light refractive index $n_3$, wherein $n_3 \simeq \overline{n_2}$.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
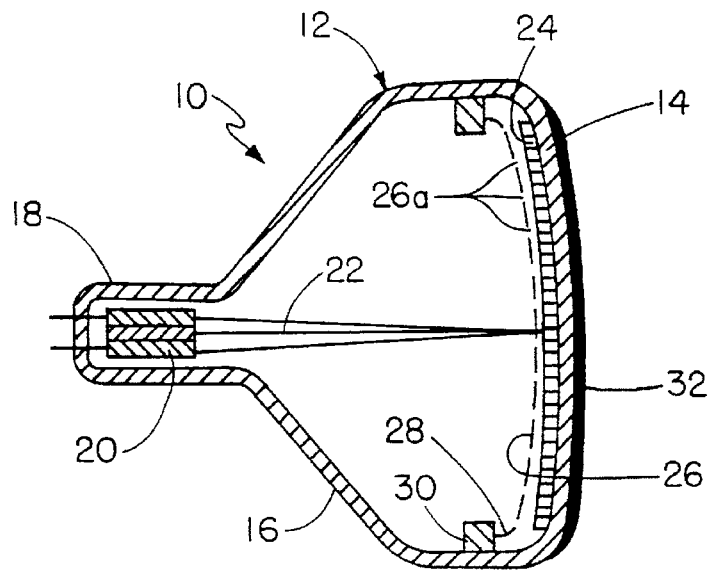
FIG. 1 is a longitudinal sectional view of a CRT incorporating a multilayer antistatic/antireflective coating in accordance with the principles of the present invention.

Referring to FIG. 1, there is shown a sectional view of a color CRT 10 incorporating a multilayer antistatic/ antireflective coating 32 in accordance with the principles of the present invention. CRT 10 includes a sealed glass envelope 12 having a forward faceplate or display screen 14, and aft neck portion 18, and an intermediate funnel portion 16. Disposed on the inner surface of glass faceplate 14 is a phosphor screen 24 which includes a plurality of discrete phosphor deposits, or elements, which emit light when an electron beam is incident thereon to produce a video image on the faceplate. Color CRT 10 includes three electron beams 22 directed onto and focused upon the CRT's glass faceplate 14. Disposed in the neck portion 18 of the CRT's glass envelope 12 are a plurality of electron guns 20 typically arranged in an inline array for directing the electron beams 22 onto the phosphor screen 24. The electron beams 22 are deflected vertically and horizontally in unison across the phosphor screen 24 by a magnetic deflection yoke which is not shown in the figure for simplicity. Disposed in a spaced manner from phosphor screen 24 is a shadow mask 26 having a plurality of spaced electron beam passing apertures 26a and a skirt portion 28 around the periphery thereof. The shadow mask skirt portion 28 is securely attached to a shadow mask mounting fixture 30 around the periphery of the shadow mask. The shadow mask mounting fixture 30 is attached to an inner surface of the CRT's glass envelope 12 and may include conventional attachment and positioning structures such as a mask attachment frame and a mounting spring which also are not shown in the figure for simplicity. The shadow mask mounting fixture 30 may be attached to the inner surface of the CRT's glass envelope 12 and the shadow mask 26 may be attached to the mounting fixture by conventional means such as weldments or a glass-based frit.

Figure 2:
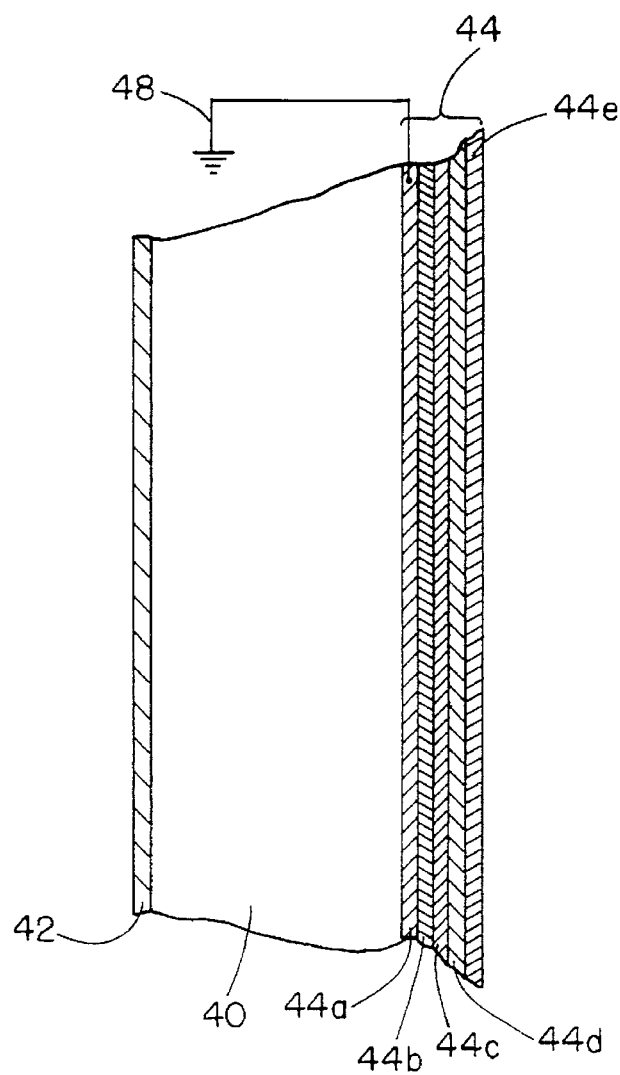
FIG. 2 is a sectional view of a portion of a flat panel display having a multilayer antistatic/antireflective coating in accordance with the present invention on the outer surface thereof.
Figure 3:
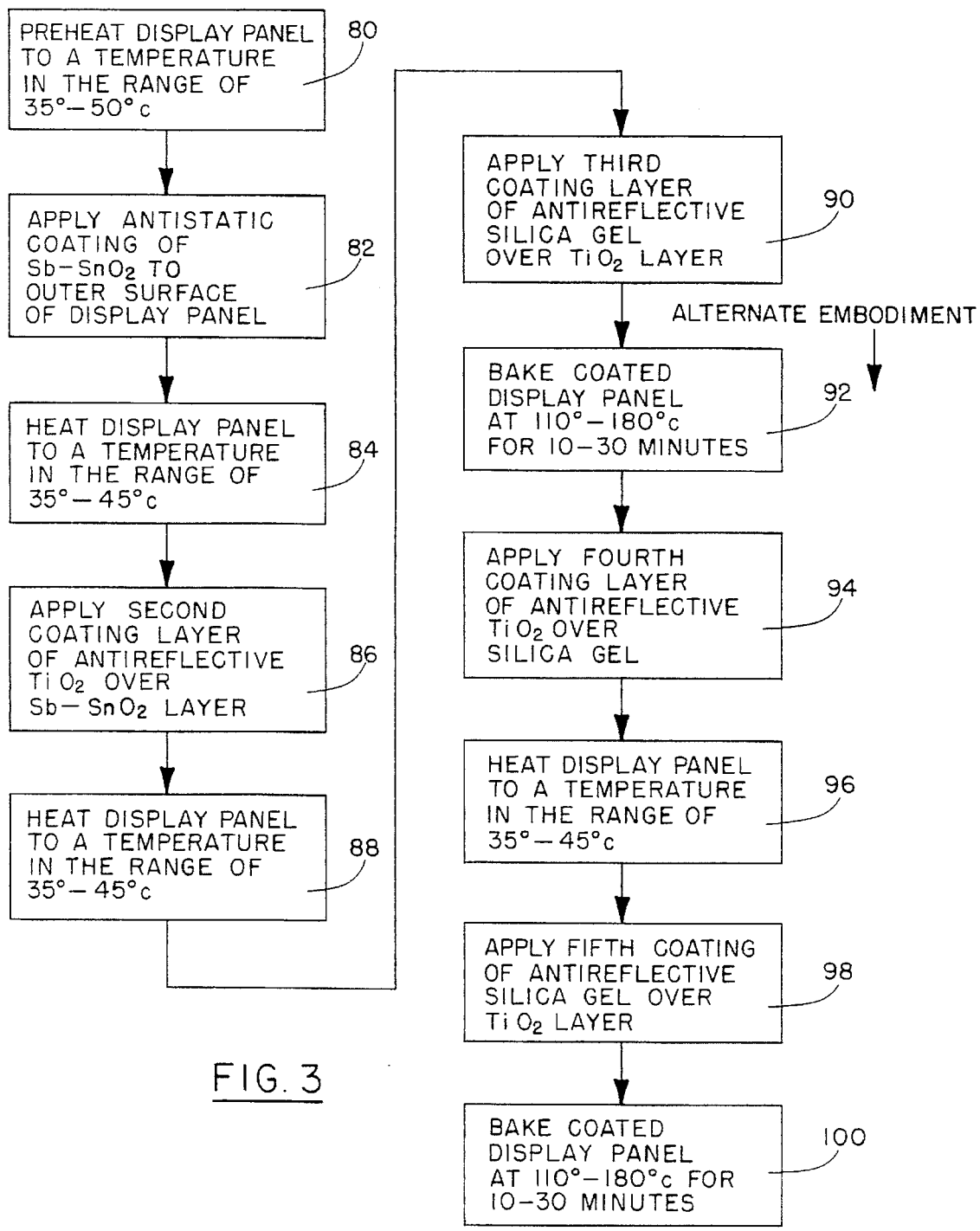
FIG. 3 is a simplified flowchart illustrating the sequence of steps in applying a multilayer antistatic/antireflection coating to the outer surface of a video display panel in accordance with the principles of the present invention.

A sectional view of a multilayer antistatic/antireflective coating 44 in accordance with the present invention disposed on the outer surface of a flat display panel 40 is shown in FIG. 2. The flat display panel 40 is comprised of a glass and has a phosphor layer 42 on its inner surface for emitting light of the three primary colors of red, green and blue in response to electron beams incident thereon. The antistatic/antireflective coating 44 includes a first inner antistatic layer 44a, a second intermediate antireflective layer 44b, a third intermediate antireflective layer 44c, a fourth intermediate antireflective layer 44d, and a fifth outer antireflective layer 44e. FIG. 3 is a simplified flowchart illustrating the steps involved in applying the antistatic/antireflective coating 44 of the present invention to a glass display panel in accordance with the principles of the present invention.

At step 80, the glass display panel 40 is preheated to a temperature in the range of 35°–50° C. The inner antistatic layer 44a is then applied directly to the outer surface of the glass display panel 40 at step 82. The first inner antistatic layer 44a is preferably comprised of antimony-doped tin oxide (Sb—$SnO_2$) having a particle size between 5–20 nm and a thickness in the range of 200–600 nm. The first inner antistatic layer 44a is coupled to neutral ground by means of a conductor 48. The first inner antistatic layer 44a not only provides an antistatic function, but also serves as the high light refractive index base for the outer layers of the antireflective coatings as it has a light refractive index of 1.8. Following deposit of the first inner antistatic layer 44a, the display panel 40 is then allowed to dry before applying the next layer of the antistatic/antireflective coating 44.

The coated glass display panel 40 is then heated to a temperature in the range of 35°–45° C. at step 84 and the second intermediate antireflective layer 44b is applied over the first inner antistatic layer 44a at step 86. The second intermediate antireflective layer 44b is preferably comprised of titanium oxide ($TiO_2$) having a light refractive index $n_2$, where $n_2=2.0$, and is applied to a thickness in the range of 100–200 nm. The $TiO_2$ layer is in colloidal form and preferably is comprised of particles in the range of 5–50 nm in diameter.

After applying the second intermediate antireflective layer 44b at step 86, the glass display panel 40 is then allowed to dry. The temperature of the glass display panel 40 is then heated to a temperature in the range of 35°–45° C. at step 88, and a third intermediate antireflective layer 44c preferably comprised of silica gel is applied over the second intermediate antireflective layer 44b of $TiO_2$ at step 90. The third intermediate antireflective layer 44c has a light refractive index of $n_3$, where $n_3 \simeq \overline{n_2} \simeq 1.45$, and thus follows the one-quarter wavelength theory relative to the second intermediate antireflective layer 44b. The third intermediate antireflective layer 44c preferably has a thickness in the range of 100–200 nm. After applying the third intermediate antireflective layer 44c, the glass display panel 40 is then baked at a temperature in the range of 110°–180° C. for 10–30 minutes at step 92.

In accordance with another embodiment of the present invention, a fourth antireflective layer 44d comprised of $TiO_2$ may be applied over the third intermediate antireflective layer 44c at step 94. The coated glass display panel 40 is then heated at step 96 to a temperature in the range of 35°–45° C. This is then followed by the application of a fifth outermost antireflective layer 44e applied over the fourth intermediate antireflective layer 44d at step 98 and preferably comprised of silica gel. The application of the fifth outer antireflective layer 44e to the glass display panel 40 is then followed by baking of the display panel at a temperature in the range of 110°–180° C. for 10–30 minutes at step 100.

Figure 4:
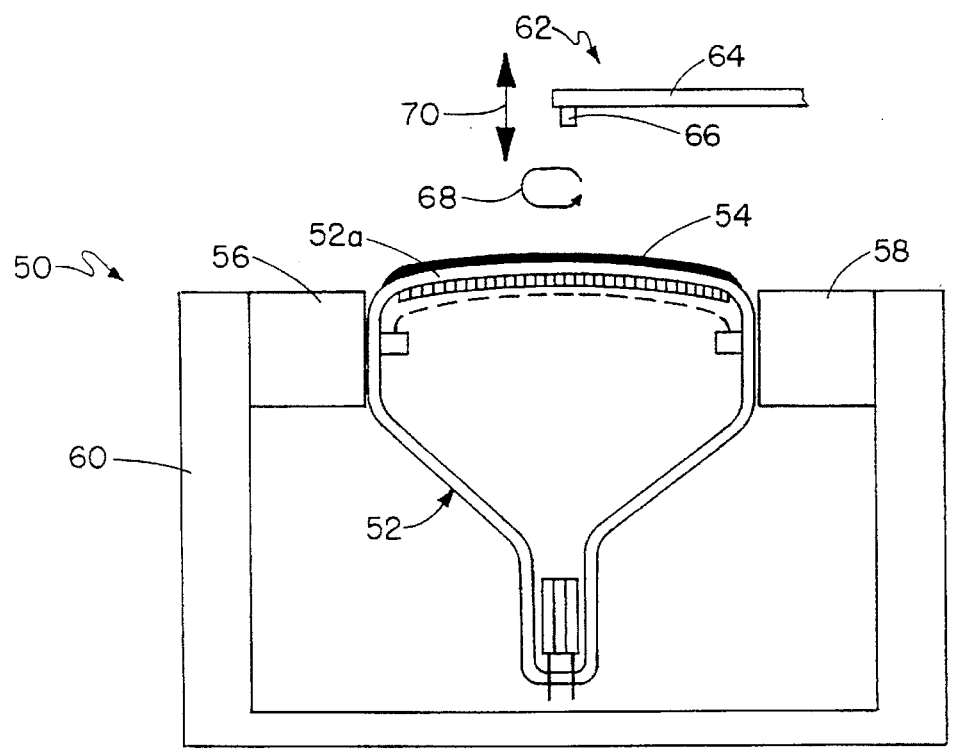
FIG. 4 is a simplified schematic view illustrating the manner in which the outer surface of a video display panel may be provided with a multilayer antistatic/antireflective coating in accordance with the present invention.

Referring to FIG. 4, there is shown in simplified schematic diagram form an antistatic/antireflective coating application apparatus 50 for applying a multilayer antistatic/antireflective coating 54 by spin coating to the glass display panel 52a of a CRT 52. The coating application apparatus 58 includes a plurality of support blocks two of which are shown as elements 56 and 58 in the figure for engaging and supporting CRT 52. A spray apparatus 62 including a spray nozzle 66 and support arm 64 is disposed above the CRT 52. The spray apparatus directs the various materials forming the several antistatic and antireflective layers onto the CRT's glass display screen 52a in the form of a fine mist. Spray apparatus 62 is capable of being raised or lowered in the direction of arrow 70 for applying layers of uniform thickness, while the coating application apparatus 50 is adapted for rotationally displacing CRT 52 in the direction of arrow 68 at a speed of 150–250 rpm. Typically, 20 ml is applied to the CRT's display screen 52a for each layer of the antistatic/antireflective coating.

Figure 5:
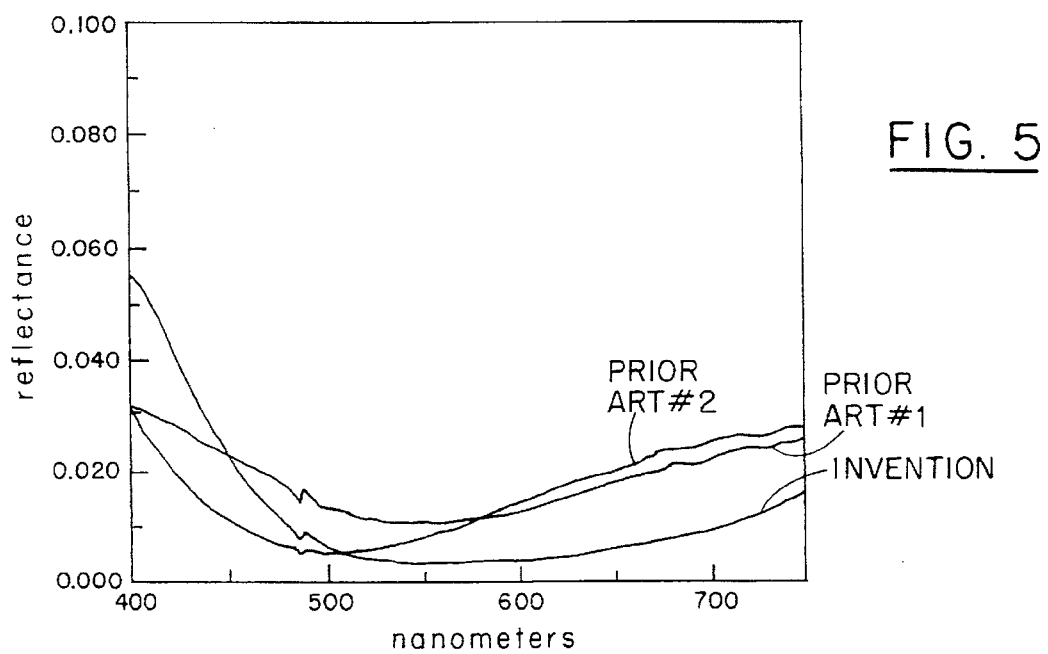
FIG. 5 is a graphic comparison of the reflectance of the multilayer coating of the present invention with two commercially available antireflective coatings.

Referring to FIG. 5, there is shown a graphic comparison of the reflectance of a multilayer antistatic/antireflective coating in accordance with the present invention as compared with two prior art antireflective coatings. The reflectance of the multilayer coating of the present invention is labelled "Invention" and shows reduced light reflectance for wavelengths greater than approximately 500 nm. The curve labeled "Prior Art Number 1" is a graphic representation of the reflectance of a two-layer antistatic/antireflective coating available from Asahi Glass Company, while the curve labelled "Prior Art Number 2" is a graphic representation of the light reflectance of an antistatic/antireflective coating available from Sumitomo Glass Company. From these curves, it can be seen that the multilayer antistatic/antireflective coating of the present invention provides reduced light reflection from the outer surface of the display panel over most of the visible spectrum.

There has thus been shown a multilayer antistatic/antireflective coating for a video display panel and a method of application therefor. The antistatic/antireflective coating includes a first inner antistatic layer having a high light refractive index which serves not only for static discharge dissipation, but also is the high light refractive index base for the outer layers forming the antireflective coating. The antireflective/antistatic coating further includes a second intermediate antireflective layer having a higher light refractive index than the first inner antistatic layer. The antireflective/antistatic coating further includes a third outer antireflective layer having a lower light refractive index than the first two layers. Another embodiment includes fourth and fifth outer antireflective layers respectively similar in composition and light refractive indices to the second and third intermediate antireflective layers. The various layers forming the antireflective/antistatic coating may be applied by the liquid spin method and offer wideband reflection suppression from the video display panel. The refractive index of the second intermediate layer is greater than that of the first inner antistatic layer, while the light refractive index of the third intermediate antireflective layer follows the one-quarter wavelength theory relative to the light refractive index of the second intermediate antireflective layer.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration on and not as a limitation. The actual scope of the invention is intended to be defined in the following claims when viewed in their proper perspective based on the prior art.

We claim:

1. A video display device comprising a structure having thereon a coating comprising:

a first conductive grounded inner layer disposed on the outer surface of said display panel, said first inner layer having a light refractive index $n_1$;

a second antireflective layer disposed on said first inner layer, wherein said second layer has a light refractive index $n_2$, wherein $n_2 > n_1$; and a third antireflective layer disposed on said second antireflective layer, wherein said third antireflective layer has a light refractive index $n_3$, wherein $n_3 \simeq \overline{n_2}$.

2. The video display device of claim 1 wherein said first inner layer is comprised of antimony-doped tin oxide (Sb—$SnO_2$) and said second antireflective layer as comprised of titanium oxide ($TiO_2$).

3. The video display device of claim 2 wherein said third antireflective layer is comprised of silica gel.

4. The video display device of claim 3 wherein said antimony-doped tin oxide layer is 200–600 nm thick and is comprised of particles 5–20 nm in diameter.

5. The video display device of claim 3 wherein said titanium oxide layer is 100–200 nm thick and is comprised of particles 5–50 nm in diameter.

6. The video display device of claim 3 wherein said silica gel layer is 100–200 nm thick.

7. The video display device of claim 1 further comprising a fourth antireflective layer disposed on said third antireflective layer and a fifth antireflective layer disposed on said fourth antireflective layer, wherein said fourth and fifth antireflective layers have the same composition and light refractive indices as said second and third antireflective layers, respectively.

8. The video display device of claim 7 wherein said first inner layer is antimony-doped tin oxide (Sb—$SnO_2$), said second and fourth antireflective layers are titanium oxide ($TiO_2$), and said third and fifth antireflective layers are silica gel.

9. A method for applying a multilayer coating to the outer surface of a video display panel by means of spin coating, said method comprising the steps of:

depositing a first conductive antistatic layer on the outer surface of said video display panel, said first antistatic layer having a light refractive index $n_1$;

connecting said first conductive antistatic layer to neutral ground;

depositing a second antireflective layer on the first antistatic layer, said second antireflective layer having a light refractive index $n_2$, where $n_2 > n_1$; and depositing a third antireflective layer on the second antireflective layer, said third antireflective layer has a light refractive index $n_3$, where $n_3 \simeq \overline{n_2}$.

10. The method of claim 9 wherein said first inner layer is antimony-doped tin oxide (Sb—$SnO_2$), and wherein the step of depositing said first inner layer includes depositing said antimony-doped tin oxide to a thickness in the range of 200–600 nm with a particle size in the range of 5–20 nm.

11. The method of claim 9 wherein said second antireflective layer is titanium oxide, and wherein said titanium oxide is deposited to a thickness in the range of 100–200 nm and is comprised of particles 5–50 nm in diameter.

12. The method of claim 9 wherein said third antireflective layer is comprised of silica gel, and wherein said silica gel is deposited to a thickness in the range of 100–200 nm.

* * * * *

UNITED STATES PATENT AND TRADEMARK OFFICE
CERTIFICATE OF CORRECTION

PATENT NO. : 5,652,477
DATED : JULY 29, 1997
INVENTOR(S) : HUA-SOU TONG and CHUNG-MIN HU and MI-YUI HSU It is certified that error appears in the above-identified patent and that said Letters Patent is hereby corrected as shown below:

| COLUMN | LINE | |
|---|---|---|
| 2 | 14 | should read -- where $n_3 \simeq \sqrt{n_2}$ --. |
| 3 | 63 | should read -- where $n_3 \simeq \sqrt{n_2} \simeq 1.45$ -- |
| 5 | 33 | should read -- wherein $n_3 \simeq \sqrt{n_2}$. -- |
| 6 | 31 | should read -- where $n_3 \simeq \sqrt{n_2}$. -- |

Signed and Sealed this

Fourteenth Day of October, 1997

*Attest:*

BRUCE LEHMAN

*Attesting Officer*     *Commissioner of Patents and Trademarks*